(12) United States Patent
Tsuchihashi et al.

(10) Patent No.: US 11,181,944 B2
(45) Date of Patent: Nov. 23, 2021

(54) INPUT DEVICE AND INFORMATION PROCESSING APPARATUS

(71) Applicant: LENOVO (SINGAPORE) PTE. LTD., Singapore (SG)

(72) Inventors: Moriyuki Tsuchihashi, Yokohama (JP); Yuichi Shigematsu, Yokohama (JP); Daisuke Watanabe, Yokohama (JP); Yasumichi Tsukamoto, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/874,959

(22) Filed: May 15, 2020

(65) Prior Publication Data
US 2021/0263560 A1 Aug. 26, 2021

(30) Foreign Application Priority Data
Feb. 21, 2020 (JP) .............................. JP2020028672

(51) Int. Cl.
*G06F 1/16* (2006.01)
*G06F 3/02* (2006.01)
*G06F 3/044* (2006.01)
*G06F 3/0488* (2013.01)
*G09F 9/30* (2006.01)

(52) U.S. Cl.
CPC .......... *G06F 1/1641* (2013.01); *G06F 1/1669* (2013.01); *G06F 3/0227* (2013.01); *G06F 3/044* (2013.01); *G06F 3/04886* (2013.01); *G09F 9/301* (2013.01); *G06F 2203/04102* (2013.01); *G06F 2203/04809* (2013.01)

(58) Field of Classification Search
None
See application file for complete search history.

(56) References Cited

U.S. PATENT DOCUMENTS

| | | | |
|---|---|---|---|
| 2003/0235452 A1* | 12/2003 | Kraus | B41J 5/102 400/472 |
| 2006/0256090 A1* | 11/2006 | Huppi | A63F 13/02 345/173 |
| 2010/0039764 A1* | 2/2010 | Locker | G06F 1/1669 361/679.29 |
| 2019/0042040 A1* | 2/2019 | Kumar | G06F 3/039 |
| 2019/0064885 A1* | 2/2019 | Paik | H04M 1/7246 |

FOREIGN PATENT DOCUMENTS

JP 2019197253 A 11/2019

* cited by examiner

*Primary Examiner* — Matthew Yeung
(74) *Attorney, Agent, or Firm* — Shimokaji IP

(57) ABSTRACT

An information processing apparatus includes a first rubber dome disposed in a first area which is disposed along a first edge which is one side of a chassis and on the side of a second edge of the chassis which is located on the back side of an operation input unit which is connected to the first edge. A second rubber dome is disposed in a second area which is disposed along a third edge which is opposite to the first edge and is the other side of the chassis and on the second edge side. A third rubber dome is disposed in a third region which is disposed along a fourth edge of the chassis which is located on the front side of the operation input unit.

7 Claims, 11 Drawing Sheets

INPUT DEVICE AND INFORMATION PROCESSING APPARATUS

FIELD OF THE INVENTION

The present invention relates to an input device and an information processing apparatus.

BACKGROUND OF THE INVENTION

Nowadays, information processing apparatuses such as tablet-type PCs, smartphones and so forth each having a touch panel type liquid crystal display and not having a physical keyboard are rapidly spreading. It is desirable for the display of the information processing apparatus of this kind to be large-sized when used and to be small-sized when carried. Accordingly, an information processing apparatus which is configured to make not only a chassis but also the display foldable by using a flexible display such as an organic EL (Electro Luminescence) display and so forth is proposed. In addition, an information processing apparatus that a detachable keyboard or the like is attached to part of the display so as to make an input using the keyboard possible in order to facilitate an input operation is proposed for the information processing apparatus which is configured as described above (see Japanese Patent Application Laid-Open No. 2019-197253).

In addition, at present, a dual display type information processing apparatus that chassis on which the displays are provided are connected together via hinges and so forth is also proposed.

SUMMARY OF THE INVENTION

In the information processing apparatus which is configured to make even the display foldable and the dual display type information processing apparatus such as the above-described apparatuses, in a case where the chassis is/are folded in a state where the input device is not appropriately attached onto the display, there is a possibility that the display will be cracked or damaged.

The present invention has been made in view of above-mentioned circumstances and aims to provide an input device and an information processing apparatus which make it possible to avoid folding of the chassis in a state where the input device is not appropriately attached onto the display.

An input device which includes an operation input unit according to the first aspect of the present invention includes a member for use in incorrect attachment detection, in which the member for use in incorrect attachment detection has a first member which is disposed in a first area which is disposed along a first edge which is one side of a chassis and on the side of a second edge of the chassis which is located on the back side of the operation input unit which is connected to the first edge, on a second face which is opposite to a first face on which the operation input unit is disposed, a second member which is disposed in a second area which is disposed along a third edge which is opposite to the first edge and is the other side of the chassis and on the second edge side, on the second face and a third member which is disposed in a third region which is disposed along a fourth edge of the chassis which is located on the front side of the operation input unit, on the second face, the third member is disposed at a position where the third member is longer than the first member in distance which is measured from the first edge and is longer than the second member in distance which is measured from the third edge, and the member for use in incorrect attachment detection is a conductive member having a capacitance.

An input device which is configured to be detachably attached to an information processing apparatus which includes a touch panel and includes an operation input unit according to the second aspect of the present invention includes a member for use in incorrect attachment detection, in which the member for use in incorrect attachment detection has a first member which is disposed in a first area which is disposed along a first edge which is one side of a chassis and on the side of a second edge of the chassis which is located on the back side of the operation input unit which is connected to the first edge, on a second face which is opposite to a first face on which the operation input unit is disposed, a second member which is disposed in a second area which is disposed along a third edge which is opposite to the first edge and is the other side of the chassis and on the second edge side, on the second face and a third member which is disposed in a third region which is disposed along a fourth edge of the chassis which is located on the front side of the operation input unit, on the second face, the third member is disposed at a position where the third member is longer than the first member in distance which is measured from the first edge and is longer than the second member in distance which is measured from the third edge and the member for use in incorrect attachment detection is configured to be detectable by the touch panel.

An information processing apparatus which is made foldable and that a touch panel is disposed over faces of chassis which mutually face in a folded state according to the third aspect of the present invention includes an angle acquisition section which is configured to acquire a folding angle and a notification section which is configured to notify a user of abnormality in a case where the folding angle is less than a predetermined threshold value and an input is detected by the touch panel.

The above-described aspects of the present invention can avoid folding of the chassis in the state where the input device is not appropriately attached onto the display.

DETAILED DESCRIPTION OF THE INVENTION

In the following, embodiments of an input device and an information processing apparatus pertaining to the present invention will be described with reference to the drawings.

Figure 1:
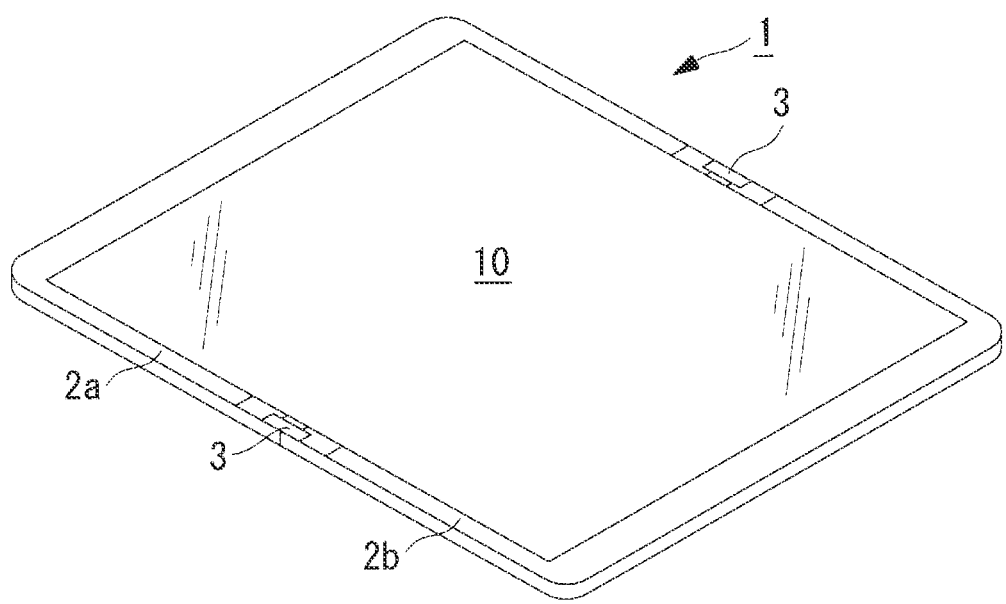
FIG. 1 is one external view illustrating one example of an information processing apparatus according to one embodiment of the present invention.
Figure 2:
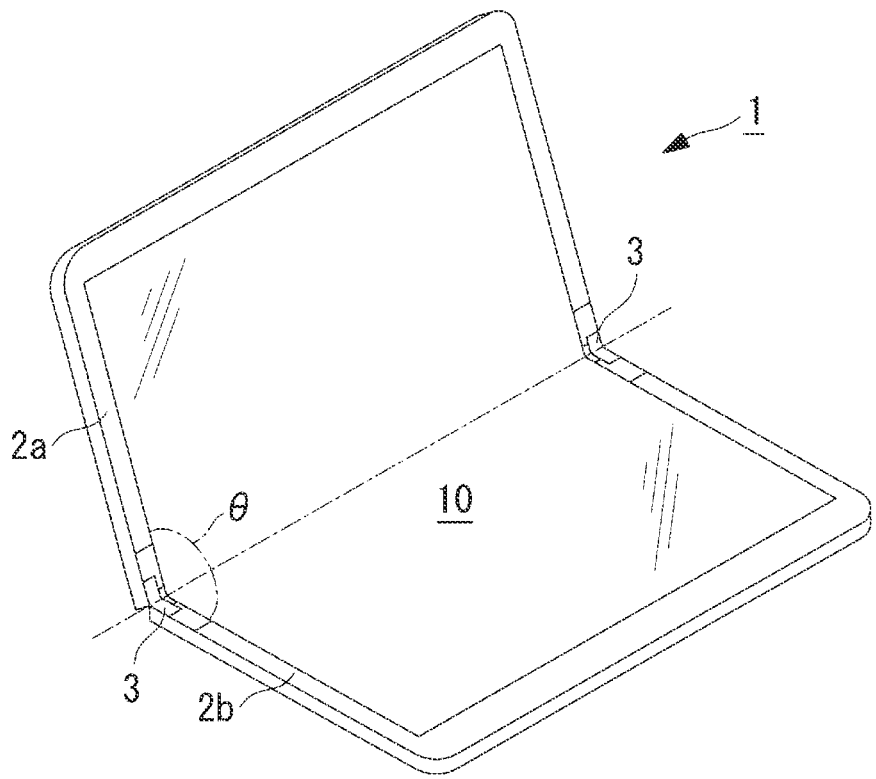
FIG. 2 is another external view illustrating one example of the information processing apparatus according to one embodiment of the present invention.
Figure 19:
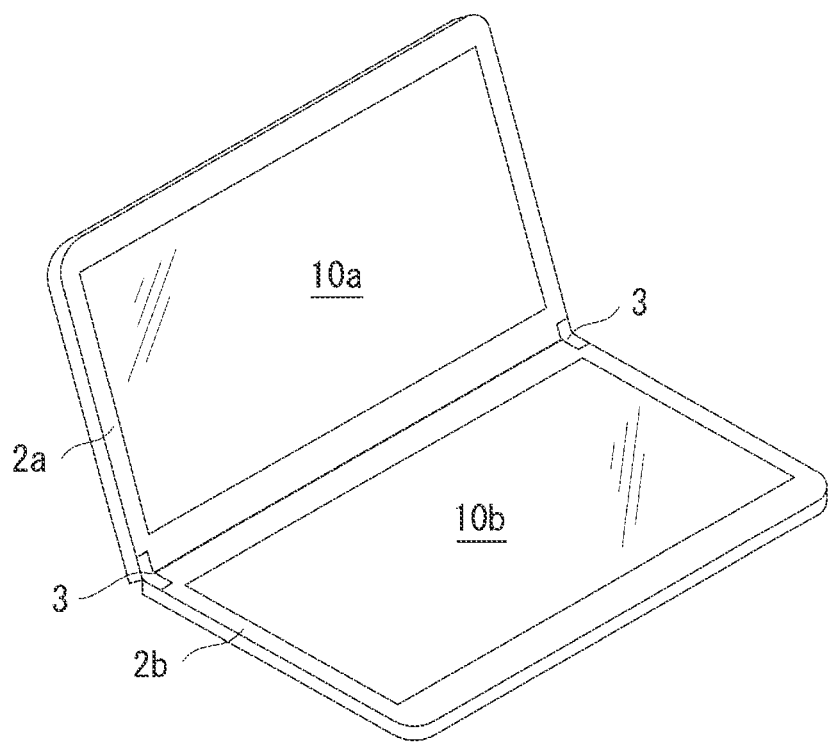
FIG. 19 is a schematic external view illustrating one example of the information processing apparatus according to another embodiment of the present invention.

FIG. 1 and FIG. 2 are external views illustrating examples of an information processing apparatus 1 according to one embodiment of the present invention. The information processing apparatus 1 is configured to be foldable and includes a touch panel 10 which is disposed over faces of chassis which mutually face in a folded state. By way of example, the information processing apparatus 1 includes a first chassis 2a and a second chassis 2b. The first chassis 2a and the second chassis 2b are coupled together by coupling parts 3 such as, for example, hinges and so forth. The touch panel 10 is disposed over inner faces of the first chassis 2a and the second chassis 2b. The touch panel 10 may either have a flexible display screen which is configured by using, for example, an organic EL (Electro Luminescence) display and so forth or have a non-flexible display screen such as a liquid crystal display. The information processing apparatus 1 is configured that the touch panel 10 is made foldable together with the first chassis 2a and the second chassis 2b in a case where the information processing apparatus 1 is folded in such a manner that the inner faces of the first chassis 2a and the second chassis 2b are mutually superposed. The information processing apparatus 1 either may have such a configuration that the touch panel 10 is continuously disposed ranging from the first chassis 2a to the chassis 2b as illustrated in FIG. 1 and FIG. 2 or may be a so-called dual display type information processing apparatus that touch panels 10a and 10b are respectively disposed on the first chassis 2a and the second chassis 2b as illustrated in FIG. 19.

Figure 3:
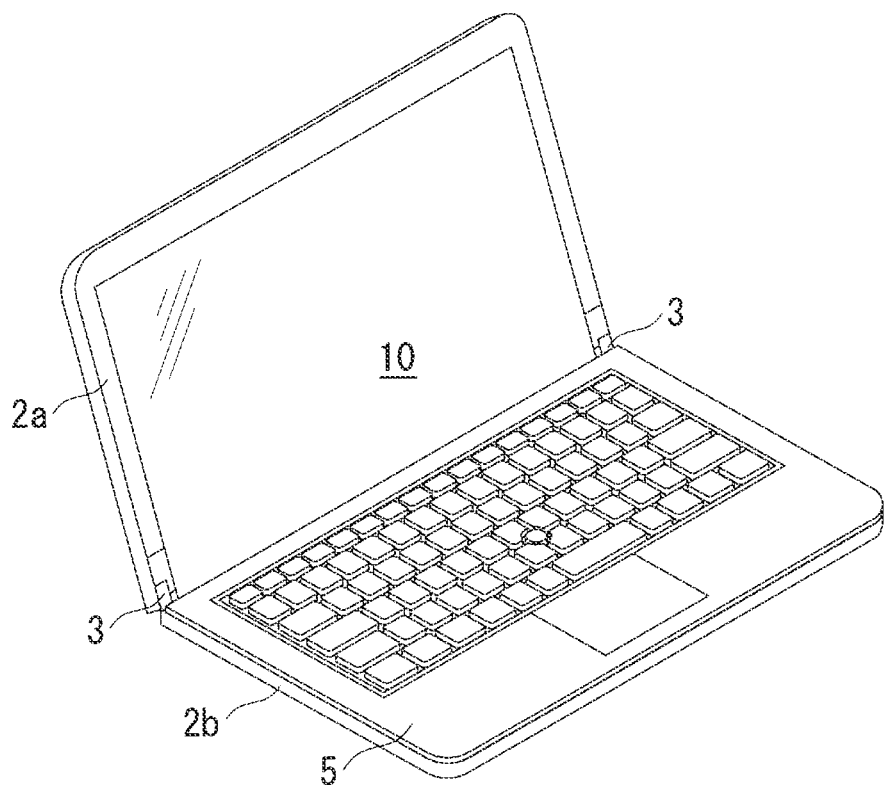
FIG. 3 is a diagram illustrating one example of a state where an input device according to one embodiment of the present invention is attached to the information processing apparatus according to one embodiment of the present invention.

It becomes possible to use the information processing apparatus 1 as a tablet terminal by opening the information processing apparatus 1 to a planar state such that a folding angle θ (see FIG. 2) between the inner face of the first chassis 2a and the inner face of the second chassis 2b reaches 180 degrees as illustrated in FIG. 1. In addition, it becomes possible to use the information processing apparatus 1 just like a Laptop PC by changing the folding angle θ as illustrated in FIG. 2. The information processing apparatus 1 is configured such that attachment of an input device 5 such as a physical keyboard and so forth onto the first chassis 2a or the second chassis 2b is possible as illustrated in FIG. 3.

Figure 4:
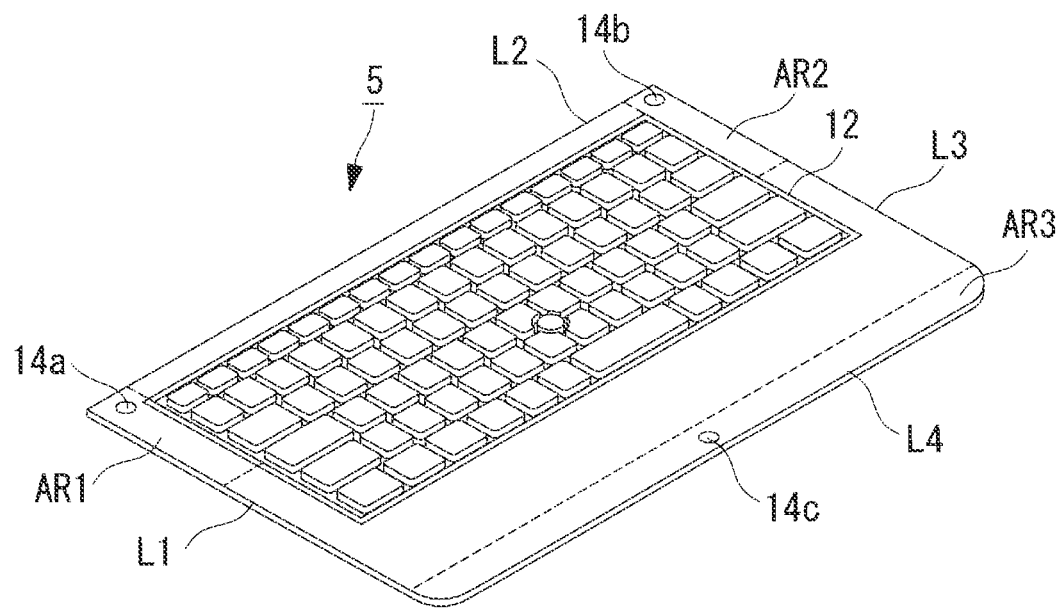
FIG. 4 is a schematic external view illustrating one example of the input device according to one embodiment of the present invention.

FIG. 4 is a schematic external view illustrating one example of the input device 5 according to one embodiment of the present invention. The input device 5 includes an operation input unit 12 as illustrated in FIG. 4. Although in one embodiment, description will be made by exemplifying a rectangular physical keyboard as the input device 5, the input device 5 is not limited to the exemplified physical keyboard and may be, for example, a touch pad, a mouse pad, an input device for game machine and so forth.

The input device 5 includes a key disposition unit that a plurality of keys is disposed as the operation input unit 12. The operation input unit 12 is an area that a user operates in a state where the input device 5 is correctly attached to the information processing apparatus 1 and thereby is able to give input information to the information processing apparatus 1. Three rubber domes 14a to 14c are disposed on a back face (a second face) which is opposite to a front face (a first face) of the input device 5 on which the operation input unit 12 is disposed as members for use in incorrect attachment detection adapted to make the information processing apparatus 1 detect that the input device 5 is not correctly attached to the information processing apparatus 1 in areas other than an area where the operation input unit 12 is disposed. In the following, in a case of distinctively illustrating the respective rubber domes 14a to 14c, the rubber domes will be called a first rubber dome (a first member) 14a, a second rubber dome (a second member) 14b and a third rubber dome (a third member) 14c. In a case of not distinguishing the rubber domes from one another, the rubber domes will be simply called the rubber dome or domes 14.

Although in one embodiment, a case where the three rubber domes 14 are disposed is exemplified, four or more rubber domes may be disposed not limited to the example illustrated in FIG. 4.

The first rubber dome 14a is disposed in a first area AR1 which is disposed along a first edge L1 which is one side of the chassis 2a or 2b and on the side of a second edge L2 of the chassis 2a or 2b which is located on the back side of the operation input unit 12 which is connected to the first edge L1, on the back face of the input device 5. It becomes possible to improve incorrect attachment detection accuracy by disposing the first rubber dome 14a at a position which is closer to the second edge L2, for example, on a corner part where the first edge L1 and the second edge L2 are connected with each other in the first area AR1.

The second rubber dome 14b is disposed in a second area AR2 which is disposed along a third edge L3 which is opposite to the first edge L1 and is the other side of the chassis 2a or 2b and on the second edge L2 side, on the back face of the input device 5. It becomes possible to improve the incorrect attachment detection accuracy by disposing the second rubber dome 14b at a position which is closer to the second edge L2, for example, on a corner part where the third edge L3 and the second edge L2 are connected with each other in the second area AR2.

The third rubber dome 14c is disposed in a third area AR3 which is disposed along a fourth edge L4 of the chassis 2a or 2b which is located on the front side of the operation input unit 12. The third rubber dome 14c is disposed at a position where the third rubber dome 14c is longer than the first rubber dome 14a in distance which is measured from the first edge L1 and is longer than the second rubber dome 14b in distance which is measured from the third edge L3. The third rubber dome 14c is disposed, for example, at the center of the third area AR3.

The rubber dome 14 is configured by a conductive member having a capacitance. That is, the rubber dome 14 is composed of a material which reacts to a capacitance-system touch panel. There is no particular limitation on a manner of attaching the rubber dome 14. The rubber dome 14 may be attached by, for example, forming a through hole in the chassis 2a or 2b of the input device 5 and then inserting the rubber dome 14 from the front face toward the back face of the input device 5. As an alternative, the rubber dome 14 may be adhered to the back face of the input device 5 with an adhesive and so forth.

Figure 5:
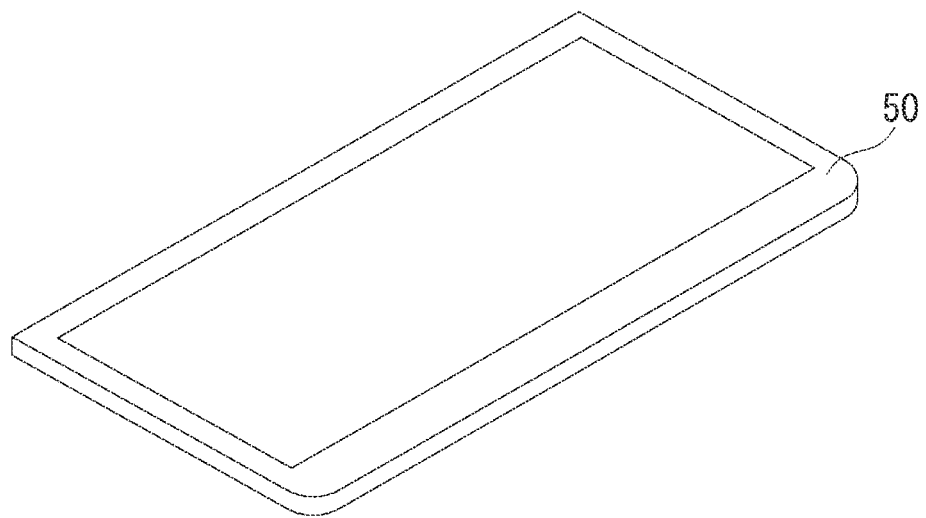
FIG. 5 is a schematic diagram illustrating one example of an external frame that the input device according to one embodiment of the present invention includes.

As illustrated in FIG. 5, the chassis 2a or 2b of the input device 5 has a metal frame material 50 and the operation input unit 12 is supported by the metal frame material 50. In addition, each rubber dome 14 is attached to the frame material 50. It becomes possible to structure the chassis 2a or 2b so as to facilitate storage of electric charges in each rubber dome 14 by using the metal frame material 50 in this way. Thereby, in a case where the input device 5 is not correctly attached to the information processing apparatus 1, it becomes possible to make each rubber dome 14 react to the touch panel 10 with ease and thereby to improve the incorrect attachment detection accuracy.

Figure 6:
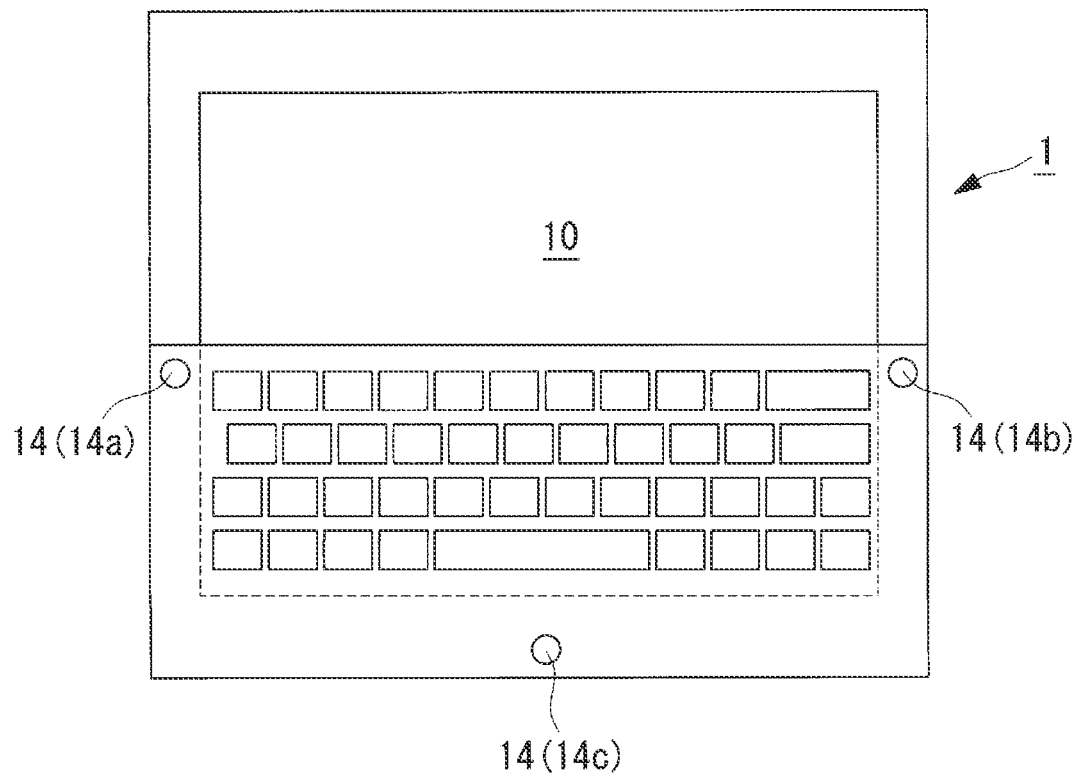
FIG. 6 is an explanatory diagram illustrating one example of disposition of respective rubber domes in a state where the input device according to one embodiment of the present invention is correctly attached to the information processing apparatus according to one embodiment of the present invention.

In addition, in a state where the input device 5 is correctly attached to the information processing apparatus 1 as illustrated in FIG. 6, the rubber domes 14 are disposed to be located on an outer frame (a vessel) which supports the touch panel 10 of the information processing apparatus 1, in other words, to be located on parts other than the touch panel 10. In addition, the rubber domes 14 are disposed such that, on the other hand, in a case where the input device 5 is not correctly attached to the information processing apparatus 1, at least one rubber dome 14 is located on the touch panel 10.

Figure 7:
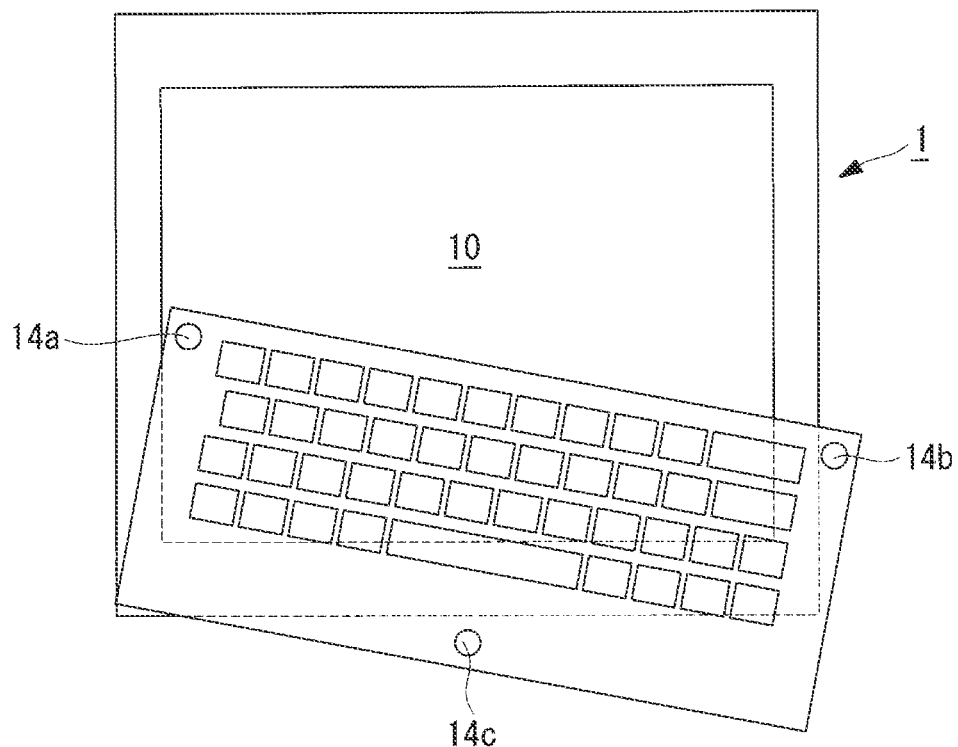
FIG. 7 is a diagram illustrating one example of one case where the input device according to one embodiment of the present invention is attached to the information processing apparatus according to one embodiment of the present invention in an obliquely deviated state although correctly oriented.
Figure 8:
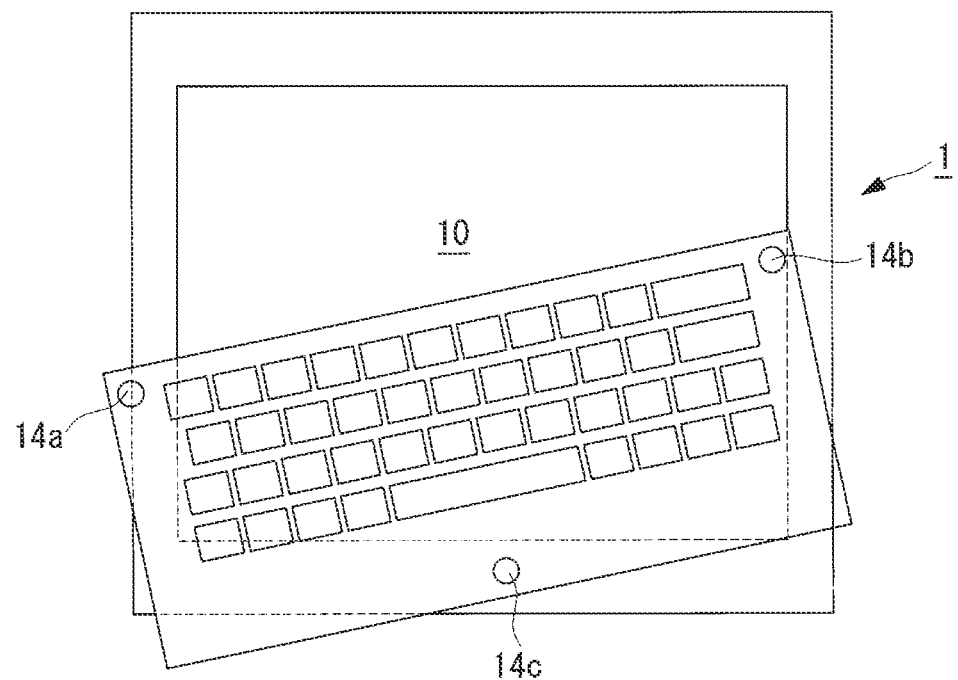
FIG. 8 is a diagram illustrating one example of another case where the input device according to one embodiment of the present invention is attached to the information processing apparatus according to one embodiment of the present invention in an obliquely deviated state although correctly oriented.
Figure 9:
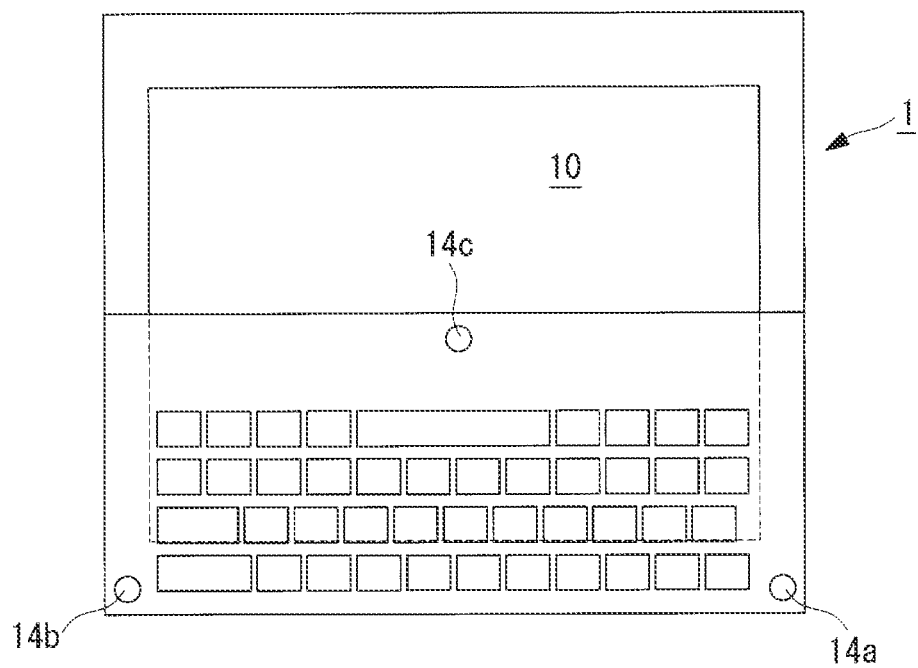
FIG. 9 is a diagram illustrating one example of a case where the input device according to one embodiment of the present invention is attached to the information processing apparatus according to one embodiment of the present invention in a state where an operation input unit is reversely oriented.

For example, FIG. 7 is a diagram illustrating one example of one case where the input device 5 is attached to the information processing apparatus 1 in an obliquely deviated state although correctly oriented, FIG. 8 is a diagram illustrating one example of another case where the input device 5 is attached to the information processing apparatus 1 in an obliquely deviated state although correctly oriented, and FIG. 9 is a diagram illustrating one example of a case where the input device 5 is attached to the information processing apparatus 1 in a state where the operation input unit 12 is reversely oriented. In a case in FIG. 7, the first rubber dome 14a is detected by the touch panel 10, in a case in FIG. 8, the second rubber dome 14b is detected by the touch panel 10, and in a case in FIG. 9, the third rubber dome 14c is detected by the touch panel 10.

Next, a hardware configuration and functions of the information processing apparatus 1 according to one embodiment of the present invention will be described with reference to the drawings.

Figure 10:
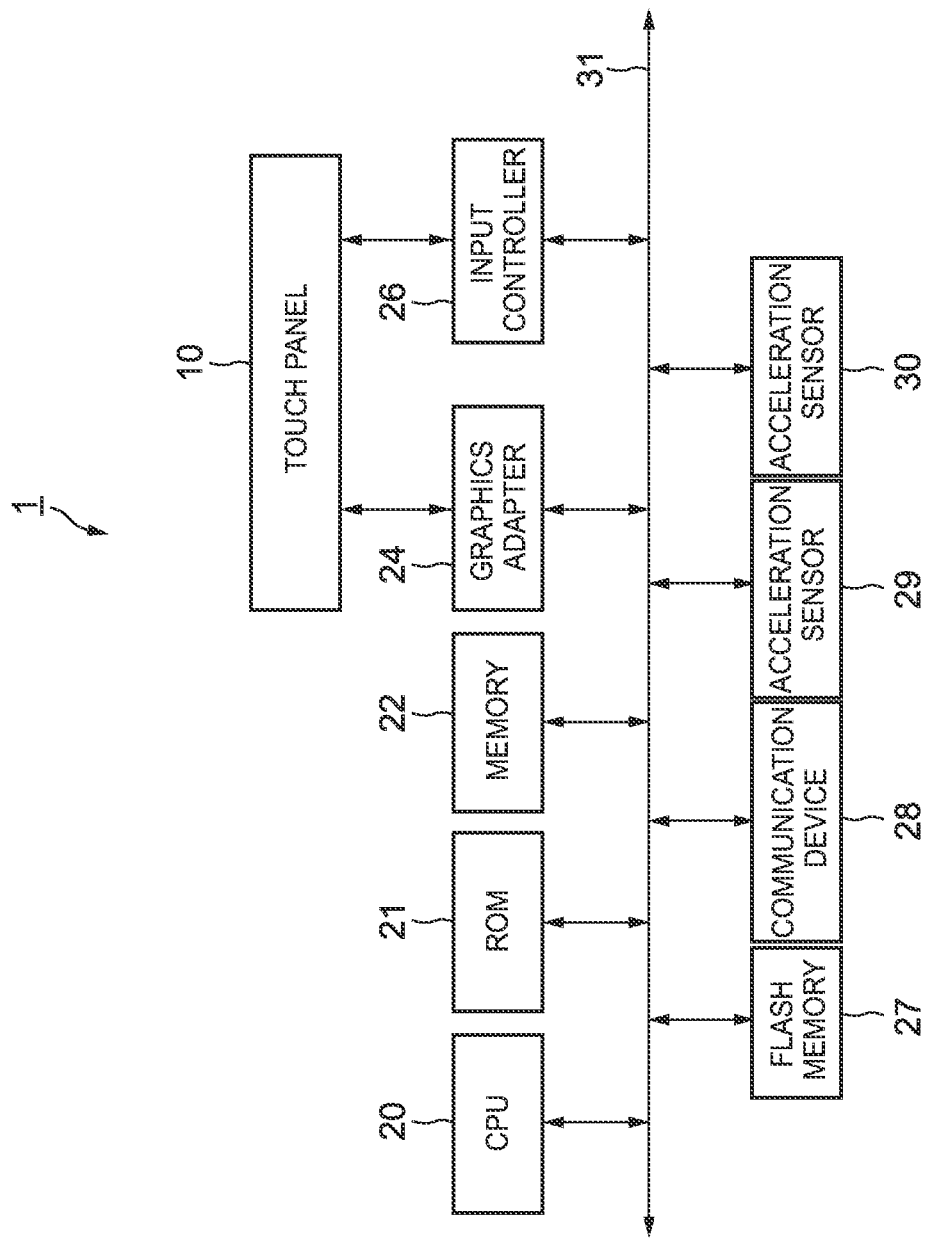
FIG. 10 is a schematic diagram illustrating one example of a hardware configuration of the information processing apparatus according to one embodiment of the present invention.

FIG. 10 is a schematic diagram illustrating one example of the hardware configuration of the information processing apparatus 1. The information processing apparatus 1 includes a CPU (Central Processing Unit) 20, a ROM (Read Only Memory) 21, a memory 22, the touch panel 10, a graphics adapter 24, an input controller 26, a flash memory 27, a communication device 28, acceleration sensors 29, 30 and so forth and respective units are directly or indirectly connected with one another via a bus 31.

The CPU 20 has a function of controlling operations of the whole information processing apparatus 1 on the basis of an OS (Operating System) which is stored in the flash memory 27 which is connected with the CPU 20 via the bus 31 and a function of executing processing on the basis of various programs which are stored in the flash memory 27. In addition, the CPU 20 makes change of throughput possible in accordance with predetermined instructions.

The ROM 21 stores a BIOS (Basic Input/Output System), various kinds of data and so forth.

The memory 22 is a writable memory which is configured by a cache memory, a RAM (Random Access Memory) and so forth and is utilized as a work area into which an execution program (for example, a control program) of the CPU 20 is read and data which is processed on the basis of the execution program is written.

The touch panel 10 is a display screen which includes a touch sensor. The touch panel 10 is, for example, a capacitance system touch panel and detects an input which is made with a finger of a user and/or using a predetermined electronic pen and outputs input information to the CPU 20. In addition, the touch panel 10 displays a video signal sent from the graphics adapter 24 on the display screen as an image in accordance with control of the CPU 20.

The graphics adapter 24 converts displayed information into the video signal in accordance with the control of the CPU 20 and outputs the video signal which is so converted to the touch panel 10.

The input controller 26 controls an operation of the touch sensor of the touch panel 10, processes a signal which is sent from the touch sensor and outputs the processed signal to the CPU 20.

The flash memory 27 has a function of storing, for example, the OS for use in control of the operations of the whole information processing apparatus 1, various drivers for use in hardware operation of peripherals, applications which are oriented to specific tasks, various kinds of data and files and so forth. Incidentally, the information processing apparatus 1 may include another/other storage(s) such as an HDD (Hard Disk Drive) and so forth as a storage or storages which is/are used in place of the flash memory 27.

The communication device 28 controls communication between the information processing apparatus 1 and other devices over a network.

The acceleration sensor (a G sensor) 29 is loaded on the first chassis 2a and detects a posture of the first chassis 2a relative to a gravity direction.

The acceleration sensor (a G sensor) 30 is loaded on the second chassis 2b and detects a posture of the second chassis 2b relative to the gravity direction.

Results of detection by the acceleration sensors 29 and 30 are output to the CPU 20.

Figure 11:
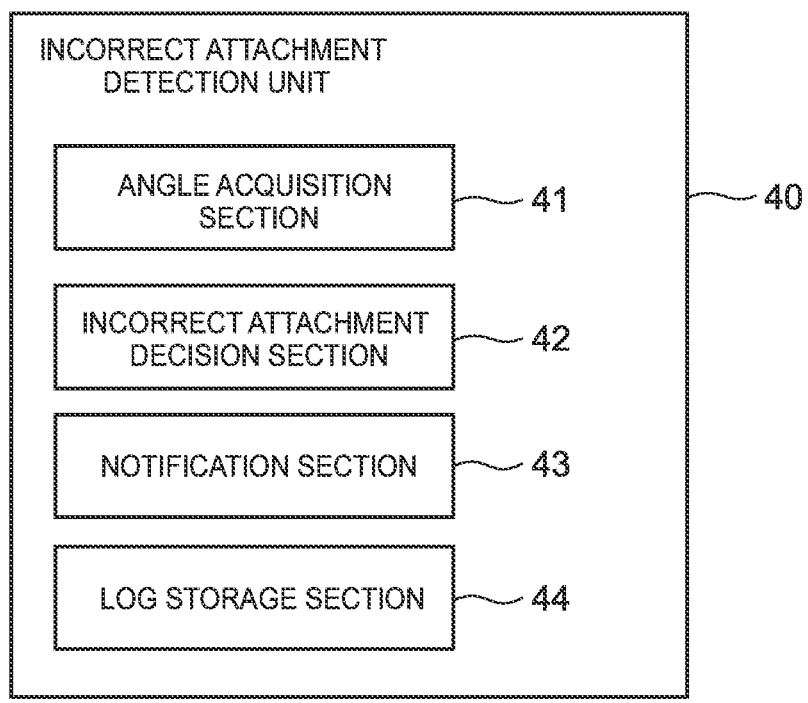
FIG. 11 is a functional configuration diagram illustrating one example that functions relating to incorrect attachment detection are mainly extracted from within functions that the information processing apparatus according to one embodiment of the present invention has.

FIG. 11 is a functional configuration diagram illustrating one example that functions relating to incorrect attachment detection of the input device 5 are mainly extracted from within functions that the information processing apparatus 1 according to one embodiment of the present invention has. A series of processing which is executed for realizing various functions which will be described later is stored in the flash memory 27, by way of example, in the form of a program (for example, an incorrect attachment detection program). The CPU 20 reads out the incorrect attachment detection program to the memory 22 and executes processing and arithmetic processing of information and thereby the various functions are realized. Incidentally, the program may be applied in the form of being installed in the flash memory 27 in advance, the form of being provided in a state of being stored in another/other computer-readable storage medium/media, the form of being distributed via a wired or wireless communication equipment and so forth. The computer-readable storage media are a magnetic disk, a magneto-optical disk, a CD-ROM, a DVD-ROM, a semiconductor memory and so forth.

As illustrated in FIG. 11, the information processing apparatus 1 includes an incorrect attachment detection unit 40. The incorrect attachment detection unit 40 includes an angle acquisition section 41, an incorrect attachment decision section 42, a notification section 43 and a log storage section 44.

The angle acquisition section 41 acquires the results of detection from the acceleration sensors 29 and 30 and acquires the folding angle θ (see FIG. 2) which is the angle between the inner face of the first chassis 2a and the inner face of the second chassis 2b from the results of detection by the acceleration sensors 29 and 30.

The incorrect attachment decision section 42 decides incorrect attachment of the input device 5 in a case where the folding angle θ which is acquired by the angle acquisition section 41 is less than the predetermined threshold value and the input is detected by the touch panel 10. The predetermined value is a value which is appropriately set in an angle range, for example, from 30 degrees or more to 60 degrees or less.

Here, the reason why the folding angle θ is taken into consideration in the incorrect attachment decision is as follows.

For example, in a case where the folding angle θ is more than the threshold value, it is thought that the operation input unit 12 is operated in a state where the input device 5 is attached to the information processing apparatus 1 in a correct posture and thereby an input signal is given to the touch panel 10. In addition, even in a case where the input device 5 is incorrectly attached to the information processing apparatus 1, the touch panel 10 is not damaged by incorrect attachment of the input device 5.

On the other hand, for example, in a case where the folding angle θ is less than the predetermined threshold value, it is possible to decide that the user is in a situation where use of the information processing apparatus 1 is terminated and that the user performs an input operation in this state is improbable in reality. In addition, in a case where a folding operation is continuously performed in this state, there is a high possibility that the touch panel 10 will be cracked or damaged by the incorrect attachment of the input device 5.

In a case where incorrect attachment of the input device 5 is decided, the notification section 43 notifies the user of the incorrect attachment. For example, the notification section 43 may either notify the user of the incorrect attachment of the input device 5 aurally with sound by sounding a buzzer, giving a voice guidance and so forth or notify the user of the incorrect attachment visually of the input device 5 by displaying an error message and so forth on the screen.

In a case where the incorrect attachment of the input device 5 is decided by the incorrect attachment decision section 42, the log storage section 44 records information on time at which the incorrect attachment of the input device 5 is decided as a log. Thereby, it becomes possible to grasp frequency and so forth of the incorrect attachment detection by confirming the log.

Figure 12:
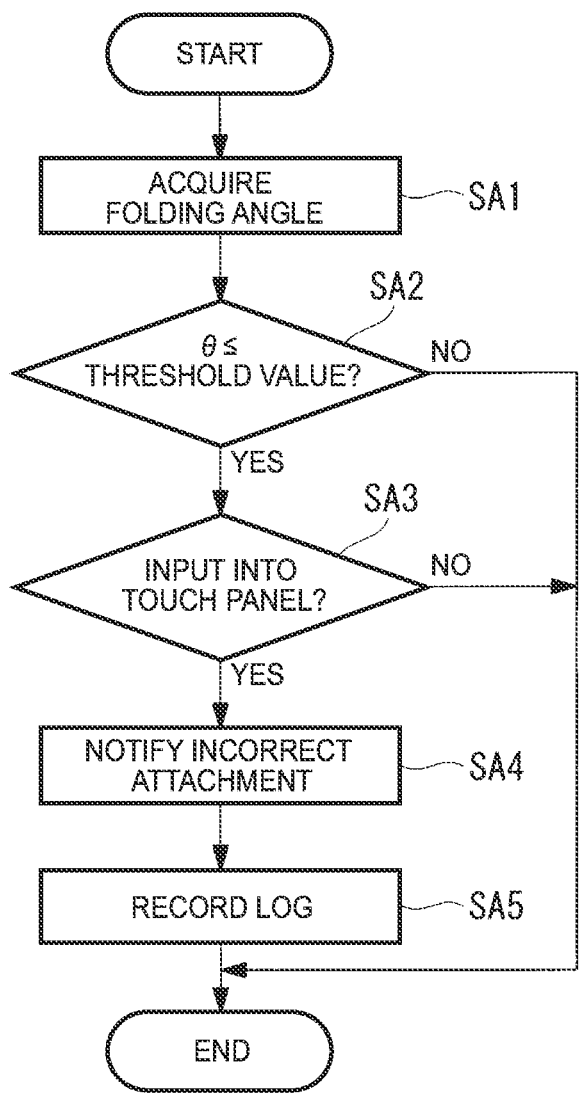
FIG. 12 is a flowchart illustrating one example of procedures of processing of an incorrect attachment detection method which is executed by the information processing apparatus according to one embodiment of the present invention.

Next, processing of an incorrect attachment detection method which is executed by the information processing apparatus 1 according to one embodiment of the present invention will be described with reference to FIG. 12. The processing of the incorrect attachment detection method is repetitively executed, for example, at predetermined time intervals.

First, the folding angle θ is acquired from the results of detection by the acceleration sensors 29 and 30 (SA1). Then, whether the folding angle θ is less than the predetermined threshold value is decided (SA2). In a case where it is decided that the folding angle θ is less than the predetermined threshold value as a result of decision (SA2: YES), then, whether the input is made to the touch panel 10 is decided (SA3). In a case where it is decided that the input is made to the touch panel 10 as a result of decision (SA3: YES), it is decided that the incorrect attachment of the input device 5 occurs and the incorrect attachment of the input device 5 is notified to the user (SA4). Then, the log of the incorrect attachment detection is recorded (SA5) and execution of the processing is terminated.

On the other hand, in a case where it is decided that the folding angle θ is more than the threshold value (SA2: NO) and in a case where the input is not made to the touch panel 10 (SA3: NO), it is decided that the incorrect attachment does not occur and execution of the processing is terminated with no notification and so forth of the incorrect attachment.

As described above, in the input device 5 according to one embodiment, since the rubber domes 14 for use in the incorrect attachment detection are disposed on the back face of the input device 5, it becomes possible to make the information processing apparatus 1 detect the incorrect attachment of the input device 5 in a case where the input device 5 is not attached to the information processing apparatus 1 in the correct posture. Thereby, it becomes possible to avoid folding of the chassis in a state where the input device 5 is not appropriately attached onto the touch panel 10 and it becomes possible to avoid damage and so forth to the touch panel 10.

In addition, in one embodiment, the first rubber dome 14a is disposed in the first area AR1 which is disposed along the first edge L1 which is the side of the chassis and on the side of the chassis second edge L2 which is located on the back side of the operation input unit 12 which is connected to the first edge L1. Thereby, it becomes possible to make the information processing apparatus 1 detect a situation where the input device 5 is attached to the information processing apparatus 1 in such a deviated state as illustrated in FIG. 7.

In addition, the second rubber dome 14b is disposed in the second area AR2 which is disposed along the third edge L3 which is the other side of the chassis and is opposite to the first edge L1 and on the second edge L2 side. Thereby, it becomes possible to make the information processing apparatus 1 detect a situation where the input device 5 is attached to the information processing apparatus 1 in such a deviated state as illustrated in FIG. 8.

In addition, the third rubber dome 14c is disposed at the position where the third rubber dome 14c is longer than the first rubber dome 14a in distance which is measured from the first edge L1 and is longer than the second rubber dome 14b in distance which is measured from the third edge L3 in the third area AR3 which is disposed along the fourth edge L4 of the chassis which is located on the front side of the operation input unit 12. Thereby, it becomes possible to make the information processing apparatus 1 detect a situation where the input device 5 is attached to the information processing apparatus 1 in such a reversely oriented state as illustrated in FIG. 9.

In addition, since the rubber domes 14 for use in the incorrect attachment detection have flexibility, even in a case where the information processing apparatus 1 is folded in a state where the input device 5 is not correctly attached to the information processing apparatus 1 in the worst case, it becomes possible to ensure some elasticity and thereby it becomes possible to reduce degree of damage to the touch panel 10.

In addition, it becomes possible to structure the input device 5 so as to facilitate storage of electric charges in the rubber domes 14 by having the metal frame material 50 which supports the operation input unit 12 and disposing the rubber domes 14 on the metal frame material 50, and thereby it becomes possible to improve the incorrect attachment detection accuracy.

Although the present invention is described as above in relation to the above-mentioned embodiments, the technical scope of the present invention is not limited to the scope described in the above-mentioned embodiments. It is possible to modify and/or improve the above-mentioned embodiments in a variety of ways within the range not deviating from the gist of the present invention and also modified and/or improved forms are included in the technical scope of the present invention. In addition, the above-mentioned embodiments may be mutually combined appropriately.

Figure 13:
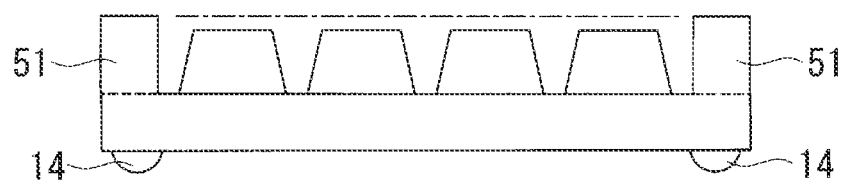
FIG. 13 is an explanatory diagram illustrating one example of a configuration of the input device according to another aspect of one embodiment of the present invention.

For example, an auxiliary member 51 which is higher than the upper face of the operation input unit 12 may be disposed in an area where the operation input unit 12 is not disposed on the front face of the input device 5. For example, in a case where the operation input unit 12 is configured as a key disposition unit that a plurality of keys is arrayed as illustrated in FIG. 13, the auxiliary member 51 which is higher than upper faces of the keys is disposed in an area other than the area where the operation input unit 12 is disposed on the front face of the input device 5. Thereby, for example, in a case where the information processing apparatus 1 is folded in a state where the input device 5 is attached to the information processing apparatus 1 in the correct posture, it becomes possible to prevent the touch panel 10 from coming into contact with the operation input unit 12.

Figure 14:
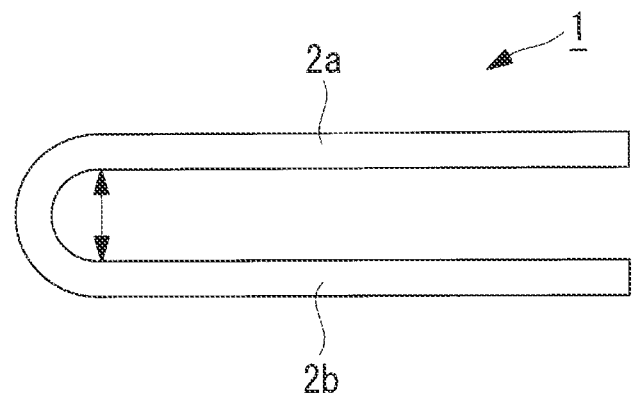
FIG. 14 is an explanatory diagram illustrating one example of a configuration of the information processing apparatus according to another aspect of one embodiment of the present invention.
Figure 15:
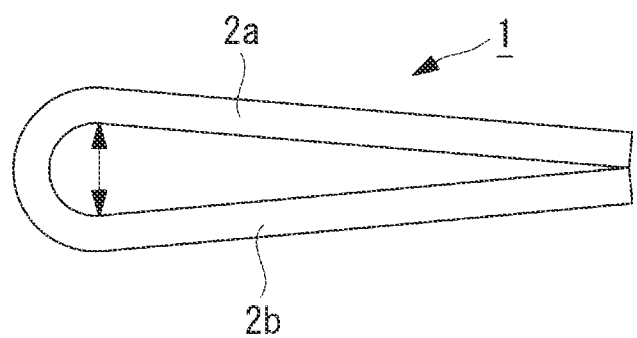
FIG. 15 is an explanatory diagram illustrating one example of a configuration of the information processing apparatus according to still another aspect of one embodiment of the present invention.

In addition, it is preferable that the information processing apparatus 1 be structured such that a predetermined gap of a size which copes with the height of the input device 5 is formed in a folded part, in other words, a hinge part between the chassis 2a and 2b as illustrated in FIG. 14 and/or FIG. 15 in order to make the information processing apparatus 1 foldable in a state where the input device 5 is correctly attached to the information processing apparatus 1.

Figure 16:
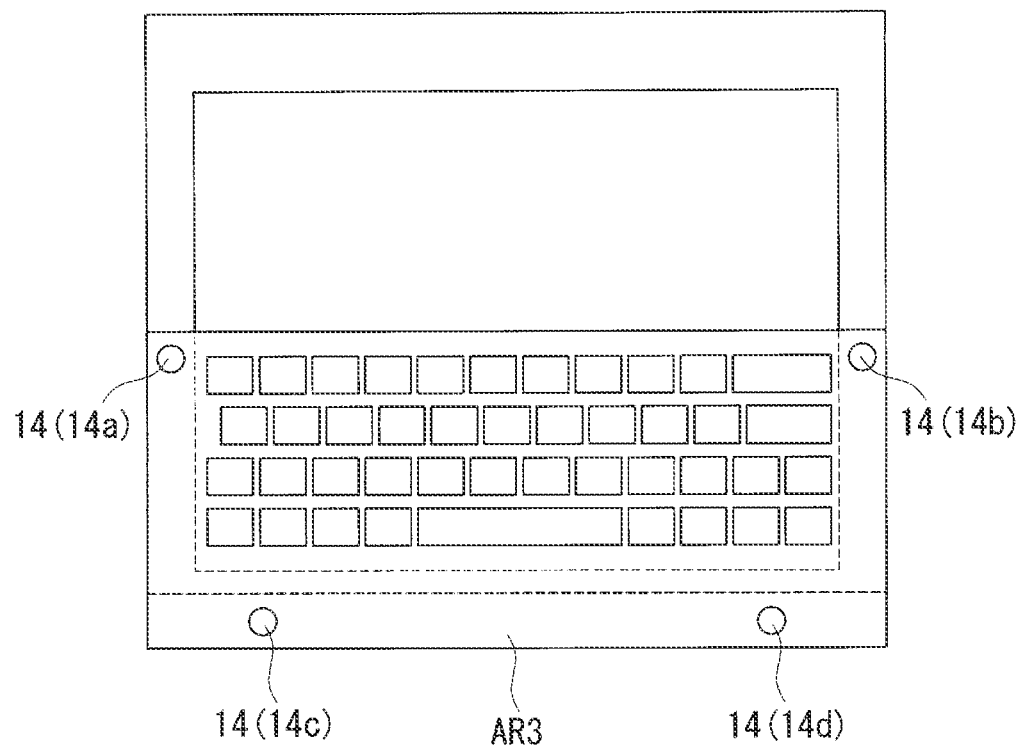
FIG. 16 is an explanatory diagram illustrating one example of disposition of the respective rubber domes in a state where an input device according to another embodiment of the present invention is correctly attached to the information processing apparatus according to one embodiment of the present invention.
Figure 17:
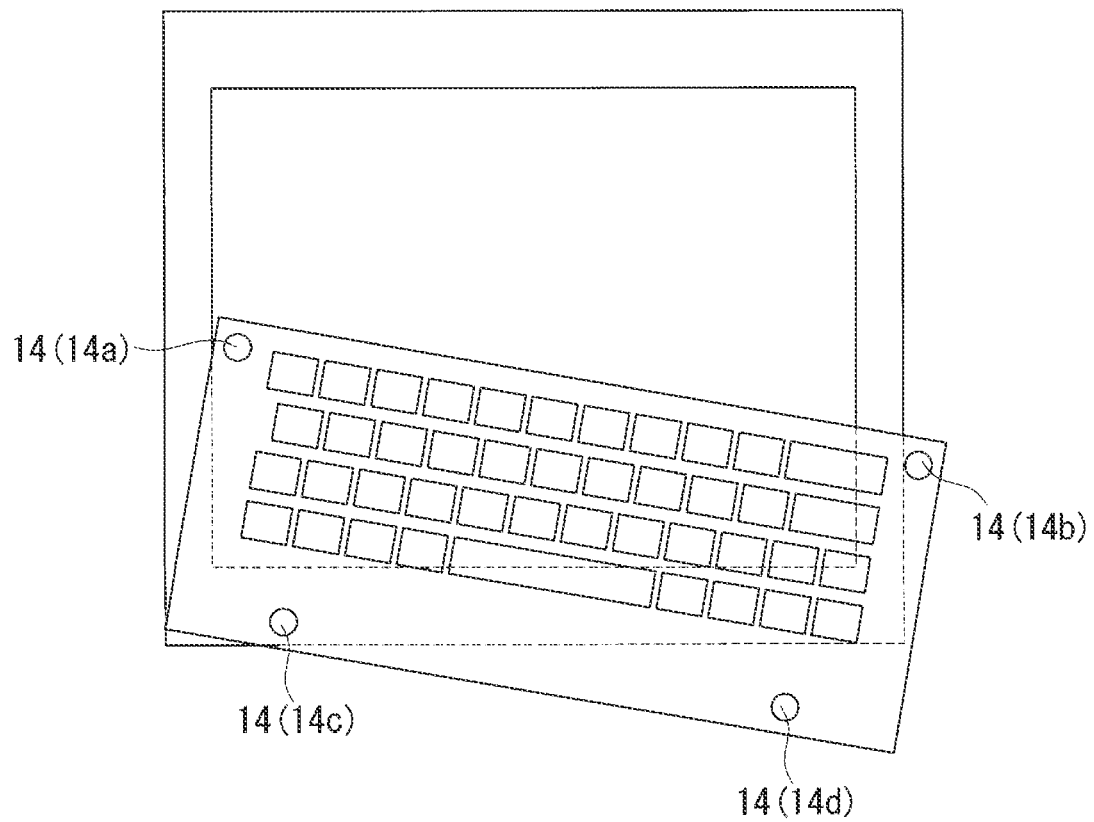
FIG. 17 is a diagram illustrating one example of a case where the input device according to another embodiment of the present invention is attached to the information processing apparatus according to one embodiment of the present invention in an obliquely deviated state although correctly oriented.
Figure 18:
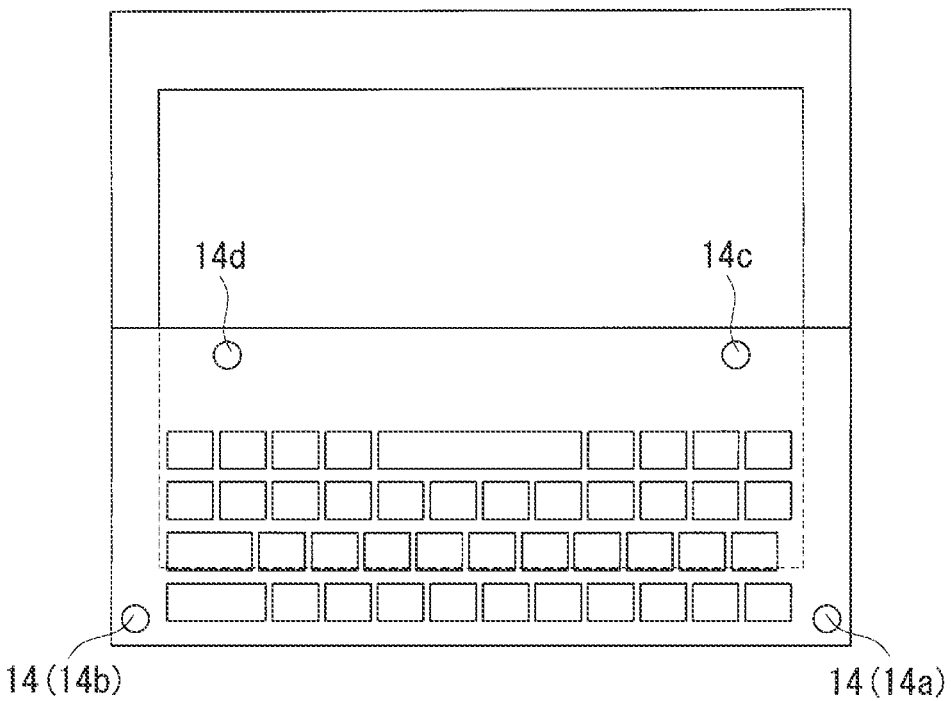
FIG. 18 a diagram illustrating one example of a case where the input device according to another embodiment of the present invention is attached to the information processing apparatus according to one embodiment of the present invention in a state where the operation input unit is reversely oriented.

In addition, although in the above-mentioned embodiments, description is made by exemplifying a case where the three rubber domes 14 are disposed, four or more rubber domes 14 may be disposed. The input device 5 according to another embodiment of the present invention has the four rubber domes 14 as illustrated in, for example, FIG. 16. In a disposition example illustrated in FIG. 16, the two rubber domes 14c and 14d are disposed in the third area AR3. Since at least one rubber dome 14 is located on the touch panel 10 in a case where the input device 5 is attached to the information processing apparatus 1 in such a deviated state as illustrated in FIG. 17 and in a case where the input device 5 is attached to the information processing apparatus 1 in such a reversely oriented state as illustrated in FIG. 18, it becomes possible to make the information processing apparatus 1 detect the incorrect attachment of the input device 5 also in the case illustrated in FIG. 16.

Incidentally, although in the above-mentioned embodiments, use of the capacitance-system touch panel 10 is set as a premise and therefore the rubber domes 14 are configured by the conductive members having the capacitances, the materials and the structures of the rubber domes 14 are not limited to the materials and the structures used in the above-mentioned embodiments. That is, the member for use in incorrect attachment detection may be configured to be capable of reacting to the touch panel 10 of the information processing apparatus 1 to which the input device 1 is detachably attached and it is possible to appropriately design the member for use in incorrect attachment detection on the basis of the mechanism of the electronic pen which reacts to the touch panel 10.

The invention claimed is:
1. An input device which includes an operation input unit, comprising:
    a member for use in incorrect attachment detection and configured to operatively interface a frame around a touch panel, wherein the member includes:
        a first member in a first area which is along a first edge of a chassis and at a second edge of the chassis, the second edge is on a back side of the operation input unit and is connected to the first edge, the first member being on a second face of the input device which is opposite to a first face of the input device on which the operation input unit is disposed,
        a second member in a second area which is along a third edge of the chassis, the third edge is opposite to the first edge and is at the second edge, the second member being on the second face, and
        a third member in a third region which is along a fourth edge of the chassis which is located on the front side of the operation input unit, the third member being on the second face, the third member is at a position where a distance from the first edge to the third member is greater than a distance from the first edge to the first member, and where a distance from the second edge to the third member is greater than a distance from the second edge to the second member, the member is a conductive member having a capacitance;

wherein the input device is configured to enable incorrect attachment detection of the input device when:

at least one of the first member, the second member, and the third member does not directly overlay the frame; and at least another one of the first member, the second member, and the third member directly overlays the frame.

2. The input device according to claim 1, wherein the member is a flexible member.

3. The input device according to claim 1, further comprising:

a metal frame material in the frame, wherein the member is configured to be on the metal frame material.

4. The input device according to claim 1, wherein an auxiliary member, which extends beyond an upper face of the operation input unit, is in an area where the operation input unit is not disposed on the first face.

5. The input device according to claim 1, wherein the operation input unit is a key disposition unit in which a plurality of keys is arrayed.

6. The input device according to claim 1, wherein the input device is configured to be detachably attached to an information processing apparatus which includes the touch panel, and in a state where the input device is correctly attached to the information processing apparatus, the member is at a position where the member faces the frame.

7. An input device which is configured to be detachably attached to an information processing apparatus which includes a touch panel and includes an operation input unit, comprising:

a member for use in incorrect attachment detection and configured to operatively interface a frame around a touch panel, wherein the member includes a first member in a first area which is along a first edge of a chassis and at a second edge of the chassis, the second edge is on a back side of the operation input unit and is connected to the first edge, the first member being on a second face of the input device which is opposite to a first face of the input device on which the operation input unit is disposed, a second member in a second area which is along a third edge of the chassis, the third edge is opposite to the first edge and is at the second edge, the second member being on the second face, and a third member in a third region which is along a fourth edge of the chassis which is located on the front side of the operation input unit, the third member being on the second face, the third member is at a position where a distance from the first edge to the third member is greater than a distance from the first edge to the first member, and where a distance from the second edge to the third member is greater than a distance from the second edge to the second member, and the member is configured to be detectable by the touch panel;

wherein the input device is configured to enable incorrect attachment detection of the input device when:

at least one of the first member, the second member, and the third member does not directly overlay the frame; and at least another one of the first member, the second member, and the third member directly overlays the frame.

* * * * *